United States Patent [19]
Hammond

[11] 3,747,942
[45] July 24, 1973

[54] CLEANING PHONOGRAPH RECORDS

[76] Inventor: Colin Edward Hammond, 90 High St., Eton, Windsor, Berkshire, England

[22] Filed: Jan. 7, 1972

[21] Appl. No.: 216,141

[52] U.S. Cl. .......... 274/47
[51] Int. Cl. .......... G11b 3/58
[58] Field of Search .......... 274/47

[56] References Cited

UNITED STATES PATENTS

| | | | |
|---|---|---|---|
| 3,005,223 | 10/1961 | Taylor et al. | 274/47 X |
| 3,150,401 | 9/1964 | Taylor et al. | 274/47 X |
| 3,345,075 | 10/1967 | Phillipson et al. | 274/47 |
| 3,401,708 | 9/1968 | Henes | 274/47 X |
| 3,588,123 | 6/1971 | Candella | 274/47 |

*Primary Examiner*—Louis R. Prince
*Assistant Examiner*—Charles E. Phillips
*Attorney*—Richard C. Sughrue, Robert J. Seas Jr. et al.

[57] ABSTRACT

Phonograph records are placed on a turntable and rotated in an anti-clockwise direction. A cleaning fluid, which may be water, an organic solvent or an aqueous detergent solution, is applied to the innermost edge of the grooved recording area. Since the recording groove spirals outwardly in a clockwise direction, the anti-clockwise motion of the turntable causes the cleaning fluid to travel outwardly across the record, carrying foreign matter with it. Waste cleaning fluid may be removed by positioning the turntable in a trough with drainage means. Cleaning fluid may be supplied to a record on the turntable by a nozzle connected via a pump to a supply tank mounted adjacent the trough. If desired a rinsing liquid may be applied in similar manner.

8 Claims, 4 Drawing Figures

CLEANING PHONOGRAPH RECORDS

BACKGROUND OF THE INVENTION

This invention is concerned with a method and apparatus for cleaning phonograph records.

Dust particles and other foreign matter are easily trapped in the grooves of phonograph records, both from normal handling and from electrostatic attraction arising from playing the record. If this foreign matter is not removed it can cause distortion of the sound reproduction and damage to the stylus.

Previous proposals for cleanig records include wiping with fine hair brushes and special impregnated dusters, optionally while the record to rotating on a phonograph turntable, or washing the record with a sponge or cloth in soapy water. In all these methods there is a risk that the playing surface of the record will be damaged by contact with the clean1ng element.

BRIEF SUMMARY OF THE INVENTION

It is the principal object of the present inventon to provide a method and apparatus for cleaning phonograph records which does not involve abrasion of the recording grooves.

According to the present invention there is provided a method of cleaning a phonograph record comprising placing a quantity of a cleaiing fluid onto the record adjacent the inner edge of playing surface and rotating the record in an anti-clockwise directions.

The record rotated at such a speed that intertial and/or centrifugal forces acting on the cleaning fluid causes the fluid to move radially outwards across the record and along the outwardly anti-clockwise spiralling grooves of the record to the outside edge of the record, thereby removing foreign matter from the grooves.

Preferably the use of the cleaning fluid is followed by a rinsing fluid. The rotation of the record may be continued until all fluids have been thrown off the edge of the record by centrifugal action.

The cleaning fluid or the rinsing fluid may be water or an organic solvent which does not affect the material of the record. Generally the cleaning fluid will be an aqueous detergent solution and the rinsing fluid water. Either or both may contain an anti-static agent.

The invention also provides an apparatus for cleaning phonograph records comprising a turntable and a driving unit arranged to rotate the turntable in an anti-clockwise direction. The driving unit w1ll generally be an electric motor.

Advantageously the apparatus is provided w1th means for delivering cleanng fluid to a record mounted on the turntable and means for removing fluid which is spun off the record. Preferably a braking device is provided to bring the turntable to a halt after completion of the cleaning process.

DETAILED DESCRIPTION

Figure 1:
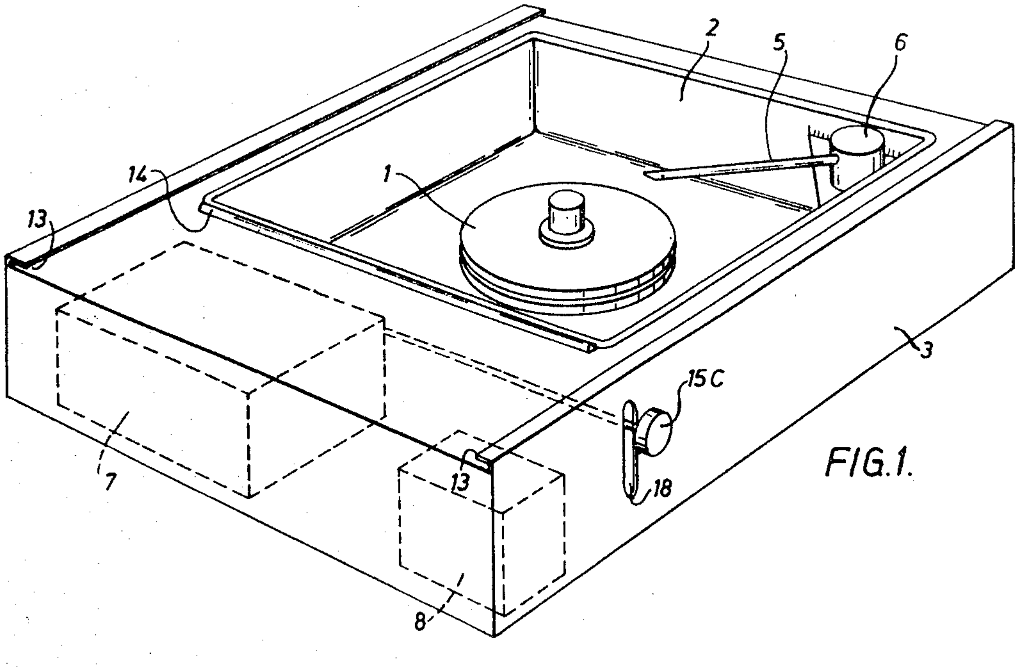
FIG. 1 is a persective view of one embodiment of the apparatus according to the invention.
Figure 2:
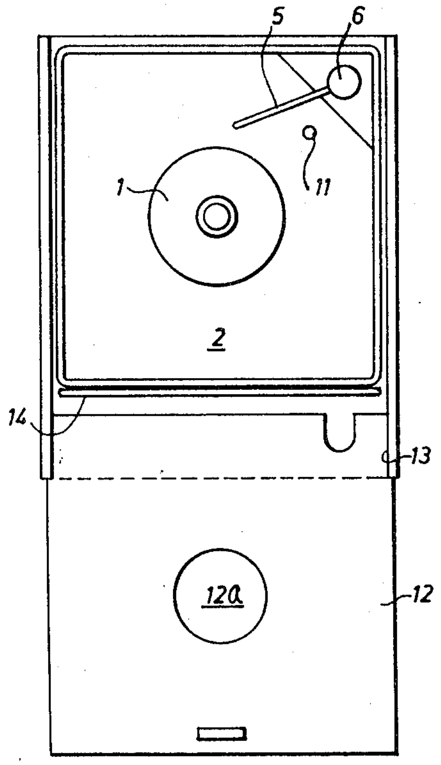
FIG. 2 is a plan view of the embodiment of FIG. 1.
Figure 3:
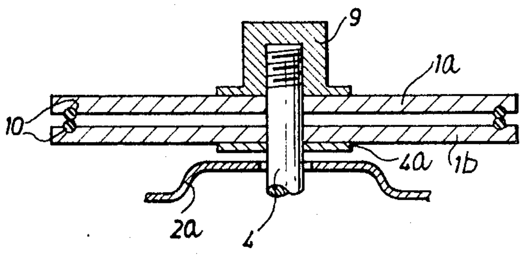
FIG. 3 is a sectional view of the turntable.

Referring to FIGS. 1 and 2, an apparatus for cleaning records comprises a turntable 1 rotatably mounted in a moulded plastics trough 2. The trough 2 is supported in a casing 3 which also supports an electric motor (not shown) the drive shaft 4 (see FIG. 3) of which passes through an aperture in the base of the trough 2 to engage the turntable. The base of the trough 2 has a raised portion 2*a* (see FIG. 3) surrounding the drive shaft 4 to prevent fluid in the trough running into the aperture through which the shaft passes.

Mounted at one corner of the trough 2 is a delivery nozzle 5 for supplying cleaning and/or rinsing fluid to a record mounted on the turntable. The nozzle 5 is attached to a rotatable knob 6 so that the nozzle may be swung in an arc across the record. The knob 6 is bored internally for passage of the cleaning fluid. The casing 3 also contains a supply tank for cleaning or rinsing fluid an a control mechanism, indicated generally at 8, for operating the turntable and delivery of fluid from the supply tank 7. This mechanism will be described in more detail below.

The turntable 1 comprises upper and lower plastics discs 1*a* and 1*b* (see FIG. 3) mounted on an abutment 4*a* of the drive shaft 4. At least the upper disc 1*a* is removable and is held on the shaft 4 by an internally threaded knob 9 which engages a thread on the shaft 4. The opposing faces of the disc 1*a* and *b* each support a peripheral rubber sealing ring 10.

In use of the apparatus, a phonograph record is gripped by the sealing rings 10 between the discs 1*a* and 1*b*. The sealing rings 10 prevent cleaning fluid contacting and possibly damaging the label at the centre of the record. The electric motor is switched on to rotate the turntable. A speed of 2,000 to 3,000 r.p.m. has been found generally suitable. A cleaning fluid is sprayed onto the record adjacent the inner edge of the playing area and allowed to spread across the record until it is thrown off the outer edge. The record may be left revolving until the playing surface has dried. A rinsing fluid may be sprayed on the record from a separate squeeze bottle if desired. Alternatively cleaning fluid may be sprayed from a squeeze bottle followed by rinsing fluid from the nozzle 5. It will be appreciated that a further nozzle may be provided similar to the nozzle 5 so that cleaning and rinsing fluids may be dispensed by controls on the apparatus.

The fluid thrown off the record collects in the trough 2 and is drained from a drainhole 11, either into a tank in the casing for future disposal or through a waste pipe to an external sink or tank. The waste pipe may be coiled for storage beneath the trough an a hinged panel is provided in the casing to lead the waste pipe to the external tank. The floor of the trough is shaped so that the drainhole 11 is at the lowest point.

So that fluid leaving the record does not splash the surrounding equipment, a transparent plastics lid 12 is provided which slides across the trough 2 in channels 13. An aperature 12*a* in the lid allows fluid to be added while the record is rotating. A rubber wiper blade 14 is positioned adjacent one side of the trough 2, so that when the lid 12 is s1id away from the trough the under surface of the lid is wiped clean of fluid, which runs back into the trough.

When the record is dry the brake is applied and after the nozzle has been swung out of the way the record may be removed.

Figure 4:
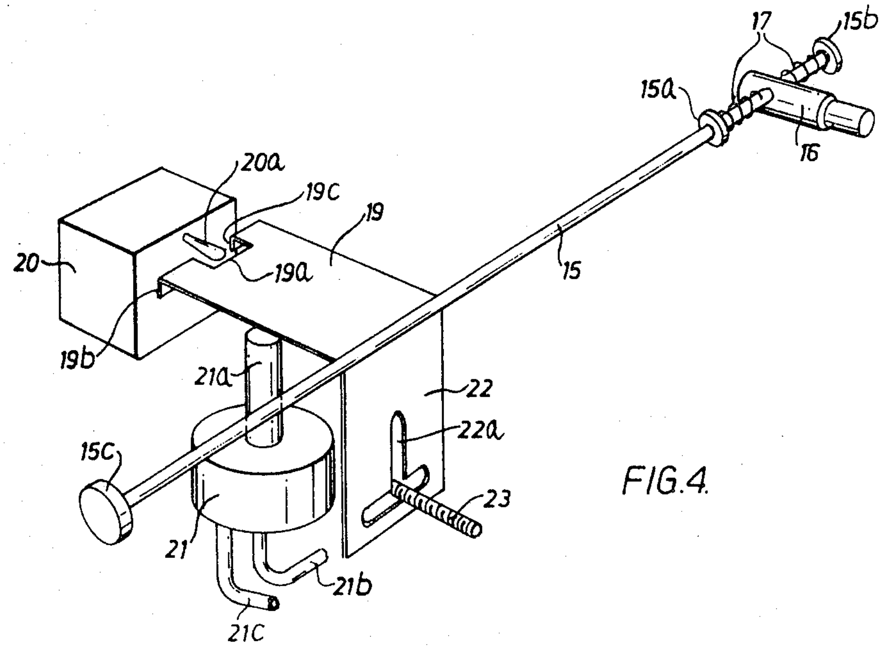
FIG. 4 is a fragmentary perspective view of the control mechanism for the rotation of the turntable and delivery of cleaning fluid.

The control mechanism is shown in more detail in FIG. 4. One end of a control arm 15 passes through a pivot pin 16 which is rotatably mounted on an inner wall of the casing. Hence the control arm 15 is movable both along its longitudinal axis and in the direction of rotation of the pivot pin 16 i.e. vertically when the apparatus is in use. The arm 15 is biassed into a middle position by springs 17 mounted on the arm on either side of the pivot pin and bearing against the pin and abutments 15 a and b on the arm 15.

The other end of the arm 15 passes through a slot 18 in the casing 3 and supports a knob 15*c* outside the casing for manual operation. From the middle position the knob 15*c* may be moved against the biassing springs 17 towards or away from the casing 3.

The control arm 15 supports a control plate 19 which extends to one side of the arm 16. The control plate 19 has a notch 19*a* in its edge remote from the arm 15, which notch 19*a* embraces the switch arm 20*a* of a three way swtich unit 20. The edge of the control plate 19 on both sides of the notch 19*a* has flanged portions 19*b* and *c* which bear against the switch arm 20*a* on movement of the control knob 15*c* towards or away from the casing 3.

Positioned beneath the control plate 19 is a plunger 21*a* of a pump unit 21 of the type commonly used for operating automobile windscreen washers. The pump unit 21 has tubes 21*b* and 21*c* leading respectively from the supply tank 7 and to the nozzle 5.

To prevent undesired movement of the control arm a further plate 22 is positioned at right angles to the plate 19. This is provided with an inverted T-shaped guideway 22*a* which is engaged by a bolt 23 attached to an inner wall of the casing 3. The guideway is positioned so that the knob 15*c* is allowed to move towards and away from the casing 3 and downwards to engage the plunger 21*a*, but the latter movement only after the knob has been moved towards the casing 3.

In the posiion shown in FIG. 4 the control arm 15 and switch arm 20*a* are in a middle position in which the switch unit 20 cuts of the electric motor from an electric current supply connected to the switch unit. On movement of the knob 15*c* towards the housing the flange 19*b* bears against the switch arm 20*a*and moves it to a position in which the current supply is connected to the motor. The swich arm 20*a* is held in this position by a detent device in the switch unit 20 strong enough to overcome the biassing action of the springs 17.

The bolt 23 is now positioned in the guideway 22*a* such that the knob 15*c* may be depressed to bring the control plate 19 into contact with the plunger 21*a*. Operation of the plunger 21*a* extracts fluid from the tank 7 and delivers it to nozzle 5 from which it is sprayed onto a record on the turntable. The plunger 21*a* is spring loaded and on release of knob 15*c* the arm 15 rises until the bolt 23 engages the base of the guideway 23. The arm 15 remains in this position until the cleaning operation as described above is complete.

The knob 15*c* is then moved away from the casing 3 overcoming the detent on switch arm 20*a* and the switch arm and control arm 15 are brought to the middle position where the current supply is disconnected from the motor. On further movement of the knob 15*c* away from the casing 3, flange 19*c* bears against switch arm 20*a* and brings it to a position where a braking device is brought into operation. In the present embodiment the motor is operated by AC current and moving the switch into this position brings a diode into the motor circuit to provide electromagnetic braking. In this position the switch arm 20*a* is biassed towards the middle position so that it returns immediately on release of the knob 15*c*. This is to prevent damage to the motor windings by prolonged operation of the brake.

When the turntable has stopped rotating, the record may be removed. It will be appreciated that a further control arm and plate may be provided to operate a further pump unit so that both cleaning and rinsing fluids may be supplied.

I claim

1. A method of cleaning a phonograph record comprising a disc having on at least one side a recording area formed by an outwardly clockwise spiral groove wherein said disc is placed on a rotatable turntable, said turntable is rotated in an anti-clockwise direction and a quantity of a cleaning fluid is applied to said disc adjacent the innermost edge of said recording area, whereby the motion of said turntable causes the cleaning fluid to travel along said spiral groove to the outer edge of said recording area simultaneously removing foreign matter from said recording area.

2 Apparatus for cleaning phonograph records comprising a housing, a turntable for holding a record in a horizontal plane rotatably mounted in said housing, a driving unit adapted to rotate said turntable in an anticlockwsie direction and means on said housing for delivering a cleaning fluid to the region of said turntable, wherein said cleaning fluid is disposed on the record at the innermost point of its spiral groove and said fluid is transported to the outermost portion of the spiral groove due to the counter-clockwise rotation of the turntable and therefore cleans the spiral groove.

3. Apparatus accordnng to claim 2, wherein said turntable is provided with means for securing a phonograph record thereto.

4. Aparatus according to claim 2, wherein said turntable is mounted in a trough in said housing, said trough having means for removal of waste cleaning fluid.

5. Apparatus according to claim 2, wherein s1id means for delivering cleaning fluid comprises a fluid supply tank, a nozzle extending over said turntable and connected to said supply tank for fluid flow therefrom, and pump means to deliver fluid from said supply tank to said nozzle.

6. Apparatus according to claim 2, comprising brake means for said driving unit.

7. Apparatus according to claim 6, wherein said driving unit is an electric motor adapted to operate by alternating current and said brake means is a diode connectable to the electric circuit of said electric motor.

8. Apparatus for cleaning phonograph records comprising a housing, a turntable rotatably mounted in said housing, a driving unit adapted to rotate said turntable in an anti-clockwise direction, brake means for said driving unit, a fluid supply tank, a nozzle extending over said turntable and connected to said fluid supply tank for fluid flow therefrom, pump means to deliver fluid from said supply tank, and a control lever movable in a first direction in a first plane to energize said driving unit, movable in a second direction in said first plane to operate said brake means, and movable in a second plane perpendicular to said first plane to operate said pump means.

* * * * *